(12) United States Patent
von Mayenburg et al.

(10) Patent No.: US 6,230,832 B1
(45) Date of Patent: *May 15, 2001

(54) TRUCK UNDERHOOD AIR FLOW MANAGEMENT SYSTEM

(75) Inventors: Michael von Mayenburg; Michael C. Salch; Dean Lee Holter, all of Lake Oswego, OR (US)

(73) Assignee: Freightliner LLC, Portland, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/711,677

(22) Filed: Sep. 4, 1996

(51) Int. Cl.$^7$ .................................................. B60K 11/00
(52) U.S. Cl. .......................................... 180/68.1; 296/208
(58) Field of Search ................................ 180/68.1, 68.4, 180/68.6; 123/41.01; 296/208, 190.09, 194

(56) References Cited

U.S. PATENT DOCUMENTS

| | | |
|---|---|---|
| 1,265,469 | 5/1918 | Mallory . |
| 1,984,077 | 12/1934 | Morrison . |

(List continued on next page.)

FOREIGN PATENT DOCUMENTS

| | | | | |
|---|---|---|---|---|
| 552153 | * | 3/1943 | (GB) | ................................... 180/68.1 |
| 985384 | * | 7/1951 | (SE) | ................................... 180/68.1 |

OTHER PUBLICATIONS

Ford AeroMax Advertisement from Chilton's Commercial Carrier Jounal for Professional Fleet Managers, p 62, Aug. 1996.*

Brochure entitled "CH600 The High Performance Highway Conventional", published by Mack Trucks, Inc., Jul. 1993.
Brochure entitled "CL Series The High–Powered Conventional From Mack", published by Mack Trucks, Inc., Sep. 1993.
Brochure entitled "Peterbilt Model 377", published by Peterbilt Motors Company, Nov. 1990.
Brochure entitled "CS Mid–Liner", published by Mack Trucks, Inc., Feb. 1994.

(List continued on next page.)

Primary Examiner—Daniel G. DePumpo
Assistant Examiner—David R. Dunn
(74) Attorney, Agent, or Firm—Klarquist Sparkman Campbell Leigh & Whinston, LLP (57) ABSTRACT

An underhood air flow management system for a truck which includes cowl openings defined between cowl extensions and the rear edges of depending hood sections. Most preferably the cowl extension extends forwardly and inwardly toward the longitudinal centerline of the truck. The cowl extensions assist in deflecting air to the cowl openings, the air having passed through a radiator, along the sides of an engine and engine compartment, and through the cowl openings. The cowl openings preferably extend the full height of the depending hood sections. The bumper of the truck includes a lower extension. In addition, the front wheel wells of the truck are sealed at the front, partially sealed at the side and may be sealed at their rear to reduce the escape of air from the engine compartment through the front wheel wells. The cowl openings are preferably door-free and also lack air flow hindering severe transitions. A charge air cooler may be positioned ahead of the radiator and a fan may be positioned between the radiator and engine. Preferably the radiator is provided with seals so that air cannot enter the engine compartment without passing through the radiator. Seals may be provided between the charge air cooler and the radiator.

14 Claims, 9 Drawing Sheets

U.S. PATENT DOCUMENTS

| | | |
|---|---|---|
| 2,701,024 | 2/1955 | Thomas . |
| 3,064,747 | 11/1962 | Barenyi . |
| 3,836,191 * | 9/1974 | Gotz .............................. 296/190.01 |
| 4,235,298 | 11/1980 | Sacket et al. . |
| 4,549,762 | 10/1985 | Burk et al. . |
| 4,562,895 | 1/1986 | Kirchweger . |
| 4,601,510 | 7/1986 | Schoppel et al. . |
| 4,706,615 * | 11/1987 | Scadding ........................... 123/41.01 |
| 4,778,029 | 10/1988 | Thornburgh . |
| 4,874,198 | 10/1989 | Roller . |
| 4,889,203 | 12/1989 | Hagarty . |
| 5,054,567 * | 10/1991 | Hoffman ............................ 180/68.2 |
| 5,267,752 * | 12/1993 | Miller .................................. 280/848 |
| 5,275,249 | 1/1994 | Nelson . |
| 5,499,690 * | 3/1996 | Shearn et al. ....................... 180/68.4 |
| 5,570,738 * | 11/1996 | Christensen ............................ 165/67 |
| 5,836,640 * | 11/1998 | Hurayt et al. ..................... 296/180.2 |

OTHER PUBLICATIONS

Brochure entitled "Kenworth T600A An Extraordinary New Era in Unconventional Thinking", published by Kenworth Truck Company, Feb. 1989.

Brochure entitled "Ford Aeroforce", published by Ford Trucks, Jan. 1991.

Photograph of a portion of a prior art Mack truck.

Drawing of a prior art grille bar cross section.

\* cited by examiner

TRUCK UNDERHOOD AIR FLOW MANAGEMENT SYSTEM

BACKGROUND OF THE INVENTION

The present invention relates to air flow systems for conducting air through an engine compartment of a vehicle, such as a truck.

In a typical truck, air flows through a grille of the truck and passes through a radiator for purposes of cooling fluid flowing through the radiator which is used in turn to cool an engine in an engine compartment.

In one conventional approach, the engine compartment is totally closed at the top by a hood and has side fenders enclosing at least portions of the sides of the engine compartment. Air entering through the radiator typically passes downwardly beneath the engine as the engine compartment is normally not closed from below and also escapes through the wheel wells of the vehicle. In these known approaches, insignificant quantities of the air which passes through the radiator flows along the side surfaces of the engine as it moves towards its escape route.

U.S. Pat. No. 1,984,077 to Morrison discloses a vehicle having a hood with side panels. The side panels are provided with openings covered by doors which may be manually opened or closed to adjust air flow through the doors. A similar opening is provided at each side of a cowl of the vehicle. The wheels of the vehicle illustrated in this patent have a fender but are otherwise exposed. The side panels of the hood extend downwardly between the fender and top rear quadrant of the wheel. With the arrangement disclosed in Morrison, one must depend upon the operator of the vehicle or another person opening the doors in order to provide additional engine compartment ventilation. Also, if the forward-most door or doors in this patent is opened, air may exit beneath the vehicle and through such openings rather than passing along the engine. Also, the doors in Morrison project outwardly and into the air stream passing along the hood when open, thereby increasing the air resistance of the vehicle when traveling in a forward direction.

U.S. Pat. No. 4,549,762 to Burk et al. discloses a ventilation arrangement for discharging hot air from the engine compartment of a car. In this arrangement, an enclosed cavity is formed in the wheel well of the vehicle. This cavity is accessible through circular openings communicating with the engine compartment. Cavity exit openings are provided along the lower side portions of the outer fender panel overlying the cavity and also through circular openings in a rear panel bounding the cavity. These latter rear panel openings communicate with the exterior of the vehicle through a crack between the door and fender. In the Burk et al. patent, air flows in a tortuous path from the engine compartment to an exit, thereby decreasing the efficiency of the air flow.

U.S. Pat. No. 3,064,747 to Barenyi discloses portions of a car with air flow guides, some of which communicate with an engine compartment. The figures of this patent disclose air flow pathways through which air is supplied or discharged from the engine compartment. Apparently the car of the Barenyi patent is air-cooled, as air flows directly into the engine compartment through a gap between the hood and front panel without passing through a radiator. A complex arrangement of gaps and air flow paths is provided in the Barenyi patent.

U.S. Pat. No. 5,275,249 to Nelson discloses a vehicle with a hood having raisable hood plates to provide rear facing engine compartment ventilation.

Although a number of prior art approaches are known for providing increased ventilation to an engine compartment, a need exists for an improved underhood air flow system.

SUMMARY OF THE INVENTION

In accordance with one aspect of the present invention, the vehicle or truck, has a frame with a longitudinal axis. A hood and first and second depending sections or fenders are coupled to the frame and together define an engine compartment. An engine is positioned within the engine compartment and a windshield extends upwardly from a location rearwardly of the hood. The hood defines a grille receiving opening within which a grille is positioned. A radiator is positioned rearwardly of the grille receiving opening so that at least some of the air passing through the grille flows through the radiator. First and second side cowl sections or portions are included in the vehicle with each side cowl section being adjacent a respective first and second rear edge of a respective depending hood section. The cowl sections each include a respective cowl extension portion which extends inwardly adjacent to the respective rear edge of the associated depending hood section. Each of the cowl extension portions has a forward air deflector surface extending forwardly toward the front of the vehicle and inwardly toward the center of the vehicle. With this construction, elongated cowl openings are defined at each side of the truck by the respective rear edges of the depending hood sections and cowl extension portions. As a result, at least some of the air entering the radiator flows past the engine, assists in cooling the engine, and exits through the cowl openings. The air deflection surfaces assist in directing the air outwardly through the cowl openings, thereby enhancing air flow through the engine compartment for cooling purposes.

In accordance with another aspect of the present invention, the cowl openings extend preferably at least about the full height of the respective rear edges of the depending hood sections. Although other shapes are possible, the cowl openings are preferably generally rectangular.

As yet another aspect of the present invention, the cowl openings are preferably door-free so that there is no need for a vehicle operator to worry about controlling the extent to which the cowl openings are open. In addition, no doors are required to extend into the air stream flowing along the outside of the fenders or depending hood sections, which could decrease the aerodynamic efficiency of the vehicle.

Most preferably, as a further aspect of the invention, the fenders or depending hood sections have sidewalls which are opening-free. Consequently, air passing through the radiator is channeled more efficiently toward the cowl openings, along with air escaping through the bottom of the truck should the vehicle bottom be opened.

Air baffles or seals are positioned to impede the flow of air that by-passes the radiator and into the engine compartment other than through the radiator. Thus, air entering the front of the vehicle is directed through the radiator to increase cooling efficiency.

As yet another more specific aspect of the present invention, the depending hood sections or side fenders of the truck define respective wheel wells. In addition, the truck has a bumper positioned below the grille and which extends from side to side of the vehicle. The bumper has a lower bumper flap extension which projects outwardly from the center of the bumper and is located along the lower forward portion of the engine compartment. The truck has wheel well roofs or splash shields positioned in the respective wheel wells. Each wheel well roof or splash shield has front and rear edges and a downwardly extending wheel sidewall portion which at least partially separates the wheel well from the engine compartment at the side of the wheel well. A front wheel well section extends from the wheel well roof front edge to the lower bumper flap extension and a mud flap section extends downwardly from the wheel well roof rear edge. Consequently, the wheel well is substantially sealed at the front and is partially sealed along the side to direct air passing through the radiator away from the wheel well at such locations.

The truck preferably includes a charge air cooler positioned between the grille and the radiator. An air deflector or seal is placed between the charge air cooler and radiator to direct air passing through the charge air cooler through the radiator. In addition, an engine cooling fan may be positioned between the engine and the radiator to assist in drawing air through the radiator, particularly when a truck is traveling up a grade or otherwise is being operated under high temperature conditions.

The air deflection surface of each cowl extension preferably has a smooth curved surface and most preferably is of a cross-section which is of a convex curved shape. In a preferred embodiment of the invention, the cowl openings are preferably over thirty square inches each and are most preferably about fifty-five to seventy-five square inches each. Generally, the larger the cowl openings the more effective is the system for allowing the flow of air through the engine compartment.

In accordance with a further aspect of the present invention, the cowl openings have an inlet communicating with the engine compartment and an outlet communicating with the exterior of the truck. The cowl openings thus define an air flow passageway from the engine compartment through which air may exit. The air flow passageway preferably lacks abrupt air flow direction changes which would be caused by severe bends in the air flow passageway. That is, a major portion of the air flow passageway lacks obstructions or severe bends that could interfere with the air flow.

As a still further aspect of the present invention, the cowl air deflecting surfaces each have a forward portion which is positioned forwardly of the respective rear edge of the depending hood section. As a result, the cowl air deflection surfaces and the depending hood sections or fenders block lines of sight along a direction perpendicular to the longitudinal axis of the truck and which extend into the engine compartment. Thus, someone looking from the side of the truck, at least one not looking forwardly into the cowl opening, cannot view the engine and other components under the hood which could detract from the aesthetic appearance of the truck.

It is therefore an object of the present invention to provide an improved underhood air flow management system for a truck.

The present invention relates to the above features, objects and advantages individually as well as collectively. These and other objects, features and advantages of the present invention will become more apparent from the drawings and description below.

DETAILED DESCRIPTION OF A PREFERRED EMBODIMENT

Figure 1:
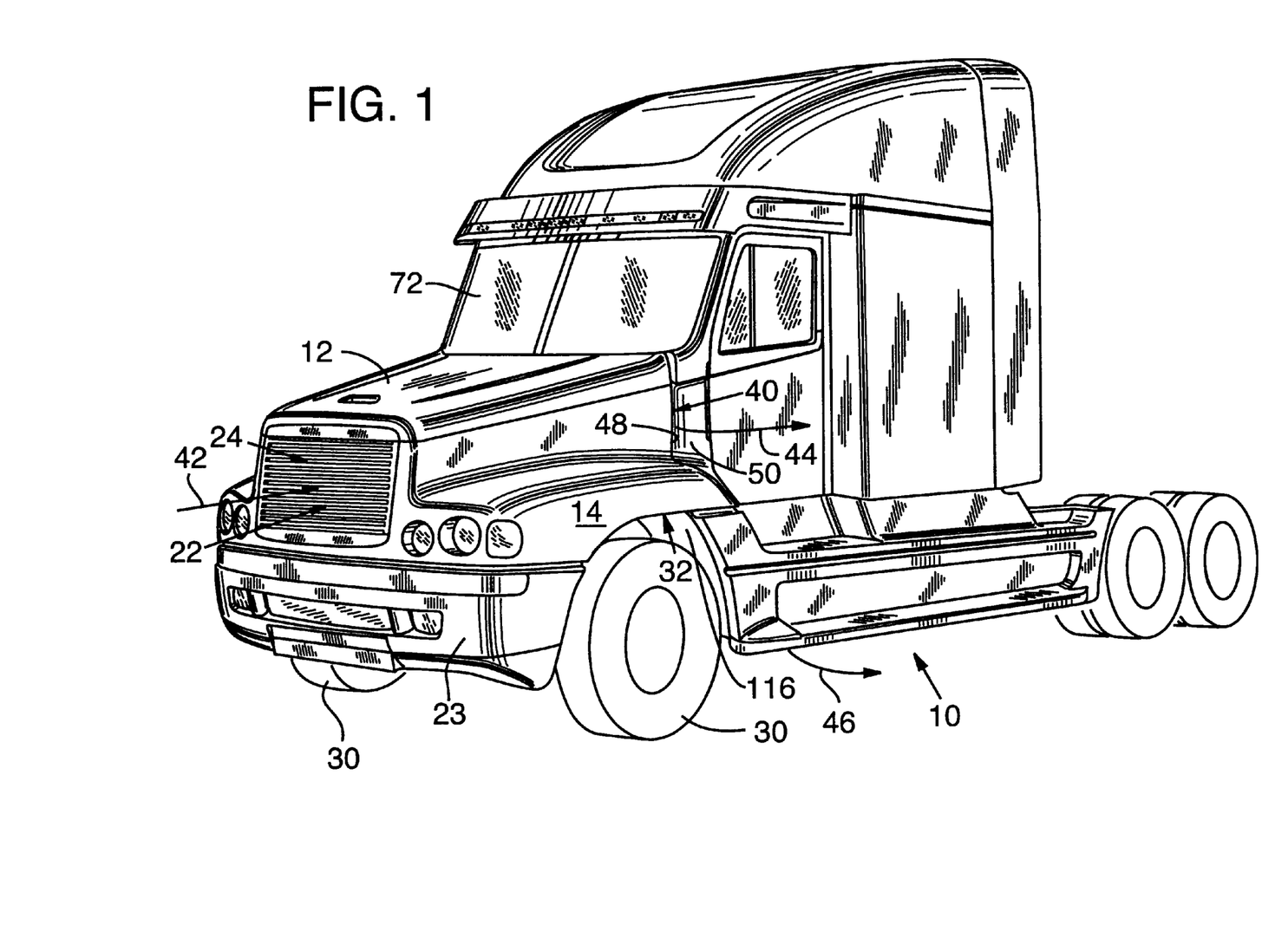
FIG. 1 is a front perspective view of a truck with a cowl opening in accordance with one embodiment of the present invention.
Figure 2:
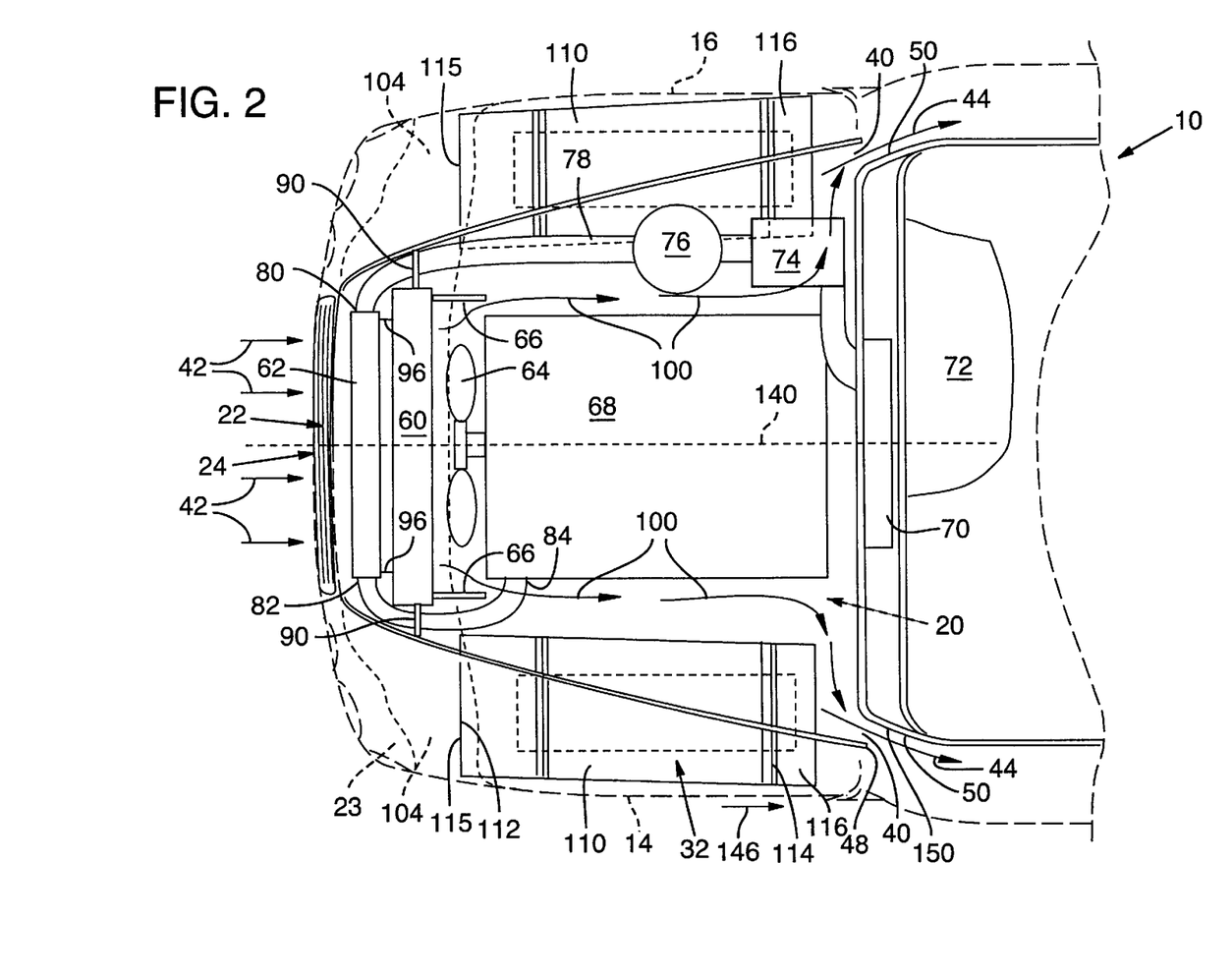
FIG. 2 is a top plan schematic view of the engine compartment of a truck having an underhood air flow management system in accordance with one embodiment of the present invention.

With reference to FIGS. 1–2, a vehicle, such as a truck 10, is shown having a hood 12, which includes depending hood sections 14, 16. The hood and depending hood sections are typically referred to as the overall "hood." Further, the depending hood sections or portions thereof are sometimes referred to as fenders, or separate fender components may accompany the depending hood sections. As such, the fenders for purposes herein are also referred to as the depending hood sections. The depending hood sections together with the hood define an engine compartment 20 (best seen in FIG. 2). A grille opening 22 is defined at the front of the hood as shown in FIG. 1 and above a bumper 23. The grille opening is covered by a grille 24. Air thus passes through the grille and grille opening toward the engine compartment. The truck 10 includes a plurality of wheels 30 (the two front wheels being shown in FIG. 2). The wheels 30 are provided with respective wheel wells, one being indicated at 32 in FIG. 1. The truck includes cowl openings 40 (one being shown in FIG. 1, and two being shown in FIG. 2) which provide an exit path for some of the air flowing into the engine compartment of the vehicle through the grille opening. That is, air entering the grille, as represented by arrow 42, passes into the engine compartment with much of the air exiting from beneath the engine compartment, as indicated by arrow 46, and some of the air passing through the cowl openings, as indicated by arrow 44. Air also enters the engine compartment (and flows along the indicated path) from an opening between the grille and the bumper. The cowl openings 40 are defined between rear edges of the respective depending hood sections, the rear edge of depending hood section 14 being indicated at 48 in FIG. 1, and a side cowl portion 50 of the truck. Preferably the cowl openings extend the full height of the depending hood sections to maximize the opening size and thereby the ease by which air may exit through the cowl openings.

As best seen in FIG. 2, air 42 passing through the grille 24 flows through a radiator 60 and to the engine compartment 20. In heavy duty truck applications, a charge air cooler 62 is often placed ahead or upstream of the radiator 60. In addition, a cooling fan 64 surrounded by an annular shroud 66 is typically placed between the radiator and an engine 68 located in the engine compartment.

Although other charge air coolers and radiators may be used, in the illustrated truck, one preferred radiator is a Model 952 core from Behr Heat Transfer Systems of Charleston, S.C. and a preferred charge air cooler is one from Garrett Thermal Systems of Torrance, Calif.

In the truck illustrated in FIG. 2, combustion air flows downwardly through an air intake 70 located below the windshield 72 of the vehicle through an air cleaner 74 and to a turbocharger 76. Air exiting the turbocharger at 78 is at a temperature of typically about 350° F. and at a pressure of about 25–30 psi. Air from the turbocharger is delivered to an inlet 80 to the charge air cooler 62 within which the pressurized air is cooled. Air from the charge air cooler exits at an outlet 82 at which time it is at a pressure of about 25 psi and a temperature of about 130° F. These temperatures and pressures of air entering and exiting from the charge air cooler may vary. This air is then delivered as combustion air to an inlet 84 of the engine 68. The description of combustion air delivery is for background purposes as the underhood air management system of the present invention is independent of how combustion air is delivered to the engine.

A recirculation shield or air deflector 90 is provided in the truck to minimize the passage of air into the engine compartment from the grille area except through the radiator 60. The shield 90 is typically mounted to the hood or framework of the vehicle and, if hood mounted, is shifted into position for sealing purposes when the hood is closed. Although shield 90 may be made of any suitable material, one specific example is masticated or recycled rubber from Boyd Corporation of Portland, Oreg. The exemplary air shields 90 may engage the sides and top of the charge air cooler 62. In addition, air seals or baffles 96 are positioned between the charge air cooler 62 and the radiator 60 to minimize the escape of the air which passes through the charge air cooler other than through the radiator. These seals may be made of any suitable material. A specific example is foam tape, such as die-cut polyurethane foam from one inch sheets from EAR Corporation of Indianapolis, Ind.

With further reference to FIG. 2, it is apparent that air passing through the radiator 60 flows through the engine compartment 20 with at least some of the air following paths 100 along the upper side surfaces of engine 68 to the cowl openings 40 at the sides of the vehicle. Air reaching this location typically passes through the cowl openings as indicated by arrows 44. In addition, although the bottom of the engine compartment may be sealed, it is typically open. Consequently, a significant portion of the air passing through the radiator 60 exits through the bottom of the vehicle, as indicated by arrows 45. Although variable, the cowl openings 40 largely receive air passing along the upper quarter of the engine in the illustrated embodiment.

Figure 3:
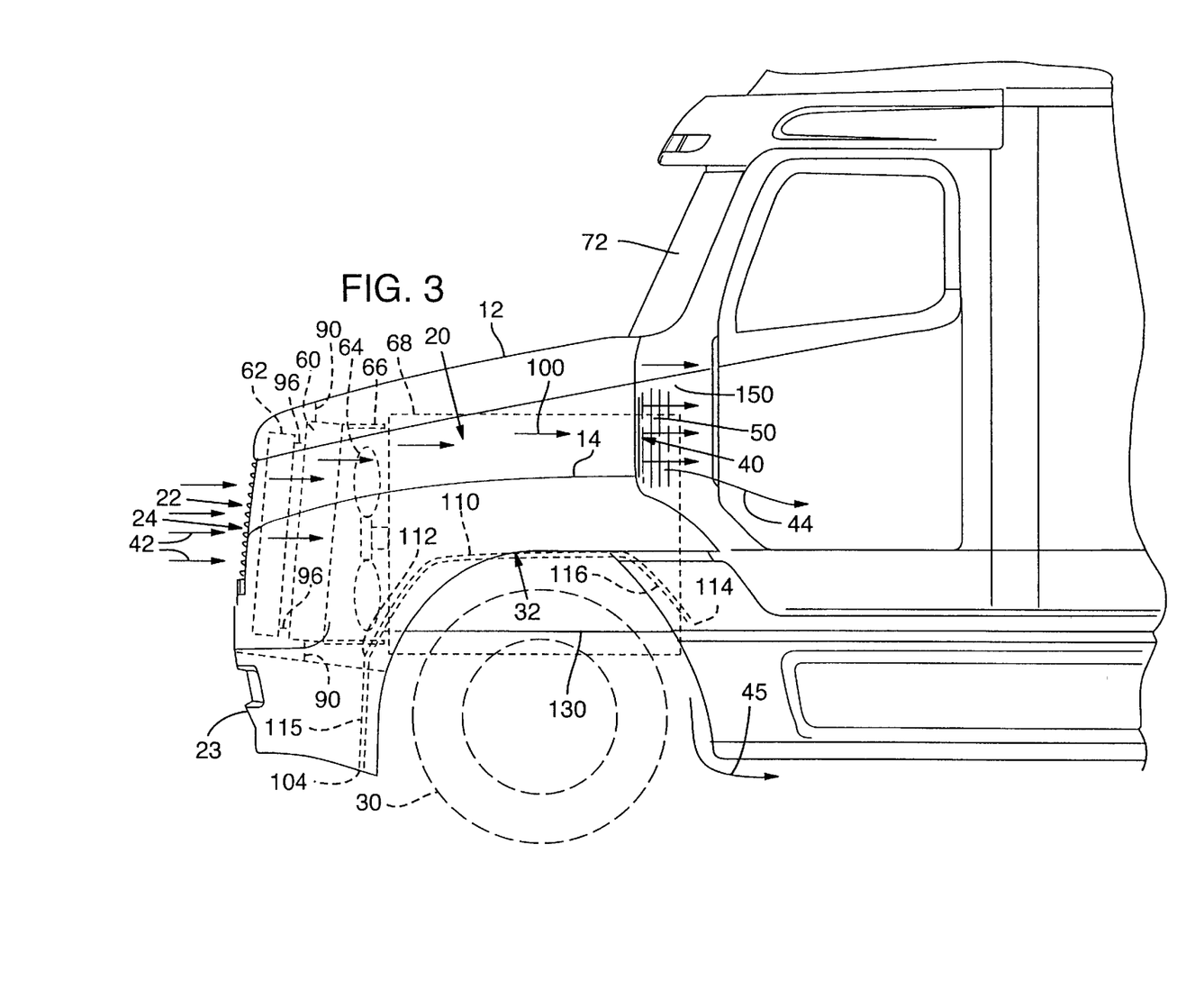
FIG. 3 is a partial schematic side view of an underhood air flow management system in accordance with one embodiment of the present invention.

The bumper 23 preferably includes a lower extension flap section or portion 104 shown in both FIGS. 2 and 3. It should be understood that the lower extension portion is an integral part of the bumper in this embodiment. The extension 104 which extends across the entire width of the bumper typically extends outwardly about twenty inches from the center portion of the bumper.

Referring again to FIGS. 2 and 3, each wheel well 32 includes components which assist in sealing the front and at least a portion of the sides of the wheel well to minimize the escape of air through such locations. By sealing the wheel well, more air is forced to flow along the engine, through the engine compartment and to the cowl openings 40. In a specific approach, the wheel well 32 is provided with a wheel well roof or splash shield 110 having a front edge 112 and a rear edge 114. For purposes of convenience, only the wheel well 32 at the left side of FIG. 2 will be described. The truck also includes a front wheel well extension section 115 extending from the front edge 112 of the splash shield or wheel well roof to the rear edge of the lower bumper extension 104. The front wheel well section thus seals the front of the wheel well. A mud flap section 116 is preferably coupled to the rear edge 114 of splash shield or wheel well roof 110 and extends downwardly for mud and rain deflection purposes. In addition, as can be seen in FIG. 3, the splash shield or wheel well roof 110 includes a downwardly projecting sidewall panel section 130 positioned between the engine compartment 20 and the wheel 30. The sidewall panel section 130 extends downwardly about one-third of the depth of the wheel well, although this may be varied.

Figure 2A:
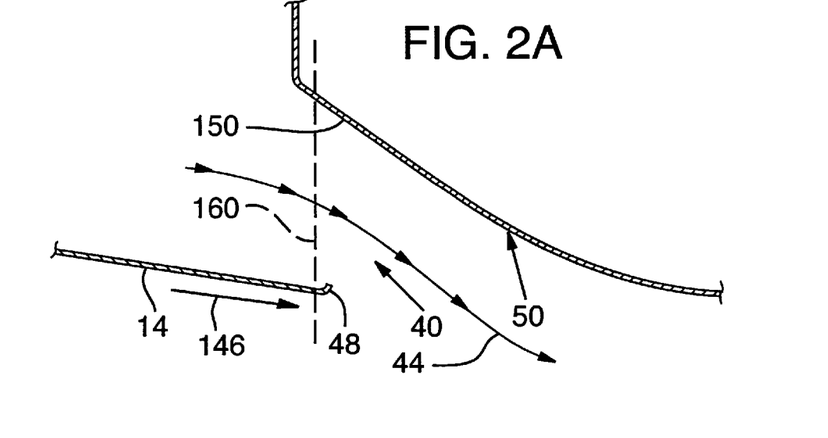
FIG. 2A is a horizontal cross-sectional view through one form of a cowl air deflector and hood section rear edge showing a cowl opening in accordance with one embodiment of the present invention.

Referring to FIGS. 2, 2A and 3, the illustrated truck 10 has a longitudinal axis 140 (FIG. 2). In addition, the cowl portions 50 project forwardly and inwardly toward the centerline 140 of the vehicle and relative to the side of the vehicle. In the preferred form, the cowl openings 40 are door-free. Also, the cowl openings are defined between the respective rear edges of the depending hood sections or fenders (e.g. rear edge 48 of depending hood section or fender 14) and an air deflection surface 150 of the cowl extension portion 50. In addition, the depending hood sections and fenders are preferably opening-free. In addition, the cowl opening most preferably lacks any projecting elements (such as doors and baffles) which extend outwardly beyond a continuation of the depending hood section side of the vehicle. Consequently, the cowl openings have minimal impact on air traveling along the side of the depending hood section or fender, such air being indicated by arrow 146 in FIG. 2A, and toward the rear of the truck. That is, air 146 joins with air 44 passing through the cowl opening from the engine compartment 20.

The air deflection surface 150 is preferably convexed in cross-section, such as shown in FIG. 2A, and is smoothly curved to provide minimal air resistance to air passing from the engine compartment toward the exit of the cowl opening 40. Furthermore, the cowl extension 150 not only dives into the interior of the engine compartment area, it also preferably extends forwardly of the rear edge of the associated depending hood section (for example, forwardly of rear edge 48 of depending hood section in FIG. 2A). Consequently, lines of sight, such as indicated by line 160, extending perpendicularly to the centerline or longitudinal axis of the vehicle, are blocked. That is, the depending hood sections and cowl extensions cooperate to block viewing of the engine compartment due to the overlapping nature of the rear edge of the depending hood section 14 and the front edge of the cowl extension 150. This configuration also substantially reduces drive-by noise from the engine compartment.

As can be seen in FIG. 2A, air may pass directly from the engine compartment through the cowl opening without having to alter course through severe bends in the air flow passageway through the cowl opening. That is, from an inlet at the engine compartment to an outlet substantially parallel to the depending hood section of the vehicle, a straight line path preferably exists for a major portion of the air passageway through the cowl opening between the engine compartment and the exit to the cowl opening. Severe bends are thus eliminated; by severe bends it is meant bends of 75°–90° or more in the air flow path.

Figure 4:
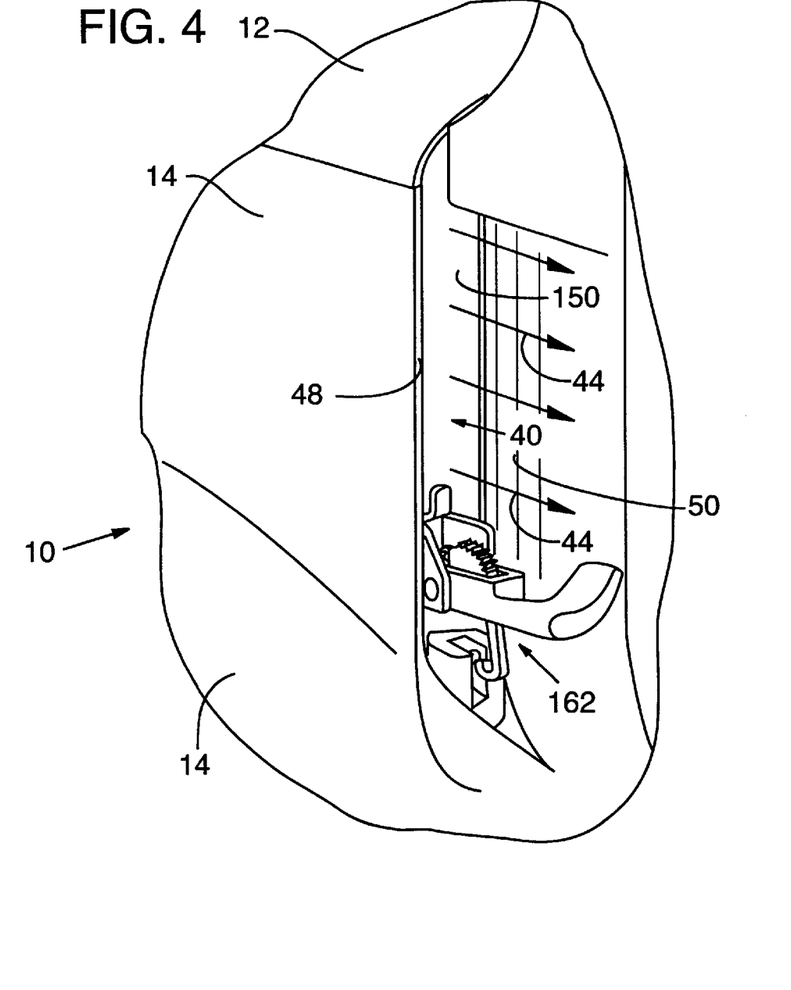
FIG. 4 is a perspective view looking from the rear of the truck showing the cowl opening in one form of the present invention.

As best seen in FIG. 4, the cowl openings preferably extend the full height of the rear edge of the associated depending hood section to maximize the size of the cowl opening. Although variable, the cowl opening is preferably at least thirty square inches and is most preferably larger, such as about seventy-five square inches. In one specific embodiment, the cowl openings are three inches wide by nineteen inches high, with one such opening being provided at each side of the truck. Devices such as vehicle hood latches (a portion of which is indicated at 162) may be positioned inside the cowl opening. Preferably, the number of such devices and their size are limited to minimize their impact on the cross-sectional area of and flow of air through the cowl openings. The cowl openings, as shown in FIG. 4, are preferably rectangular in shape, although other shapes are useful. It is most preferred to have a cowl opening which is elongated in a vertical direction. The cowl opening may extend into the hood section of the vehicle to further increase its size. By having a vertically elongated cowl opening, a pathway is provided for a taller stream of air flowing along the side of the upper portion of the engine to the cowl opening.

Figure 5:
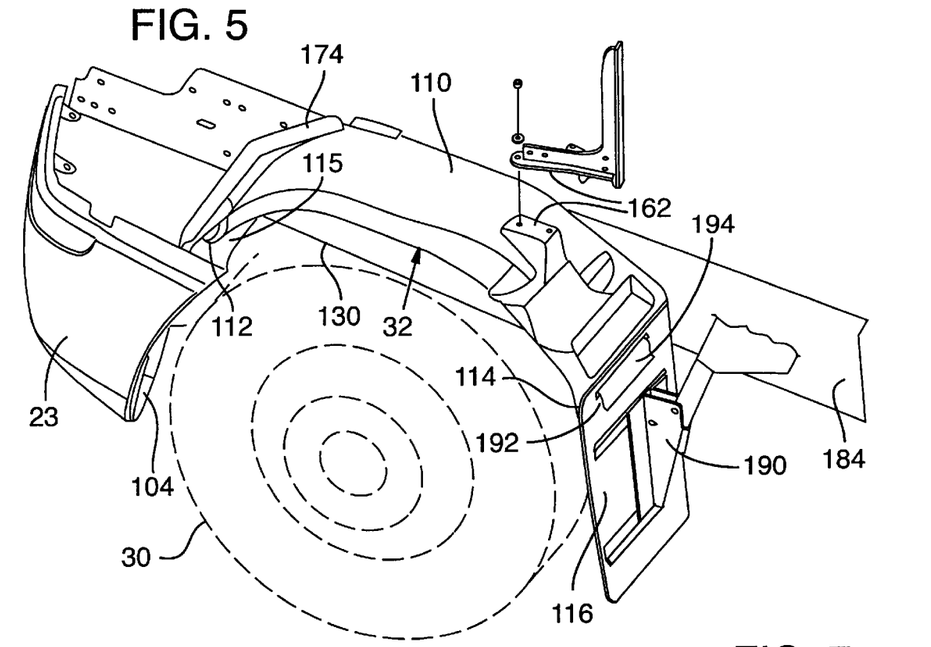
FIG. 5 is a broken-away perspective view of a wheel well roof or splash shield, roof forward extension, bumper rear extension and mud flap utilized in an embodiment of the present invention.
Figures 6, 7:
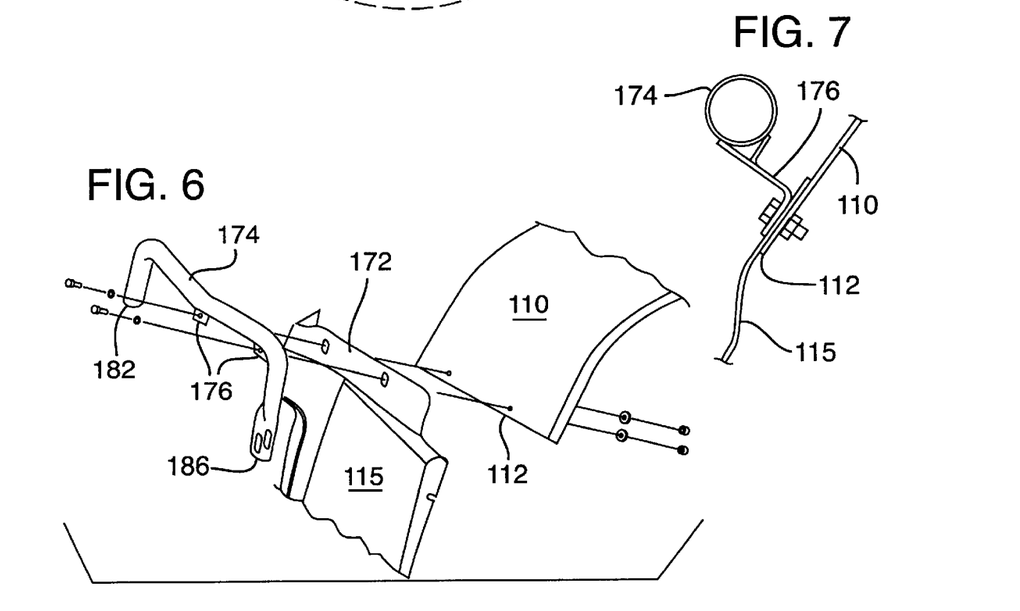
FIG. 6 is an exploded view of the front wheel well and wheel well roof or splash shield sections of FIG. 5 as well as a mounting structure for such sections.
FIG. 7 is a vertical sectional view through the wheel well roof section to front section mounting structure of FIG. 6.

The wheel well roof of splash shield 110 and related wheel well components is shown in greater detail in FIGS. 5–7 for one of the wheel wells. As shown in FIG. 5, roof 110 is arcuate to cover the top of the wheel well. The front edge 112 of the splash shield or wheel well roof section 110 is connected to an upper edge 172 of the wheel well front section 115. A generally U-shaped support bracket 174 has mounting flanges 176 through which fasteners are inserted and through the edges 172, 112 of the roof and forward wheel well sections 110, 115 to hold these elements together. An interior end portion of the bracket 174, indicated at 182 in FIG. 6, is mounted to a frame portion 184 of the vehicle. The outer end portion 186 of mounting bracket 174 is coupled to the bumper 23 by fasteners (not shown). The lower edge of forward wheel well section 115 is bolted or otherwise fastened to the rear edge portion of bumper flap extension 104.

The mud flap 116 is coupled by a mounting bracket 190 to the frame of the vehicle. A slot 192 along the upper edge portion of the mud flap receives a downturned retaining flange 194, projecting from the rear edge portion of the upper wheel well section 110. The flange 194 holds the upper end of the mud flap against the lower edge 114 of the splash shield or wheel well roof section 110.

Any suitable grille construction may be used in the airflow management system of the present invention. However, it is preferable to use a grille which minimizes air flow resistance through the grille. Thus, one specific exemplary grille is shown in FIGS. 8–13 and is described below.

Figure 9:
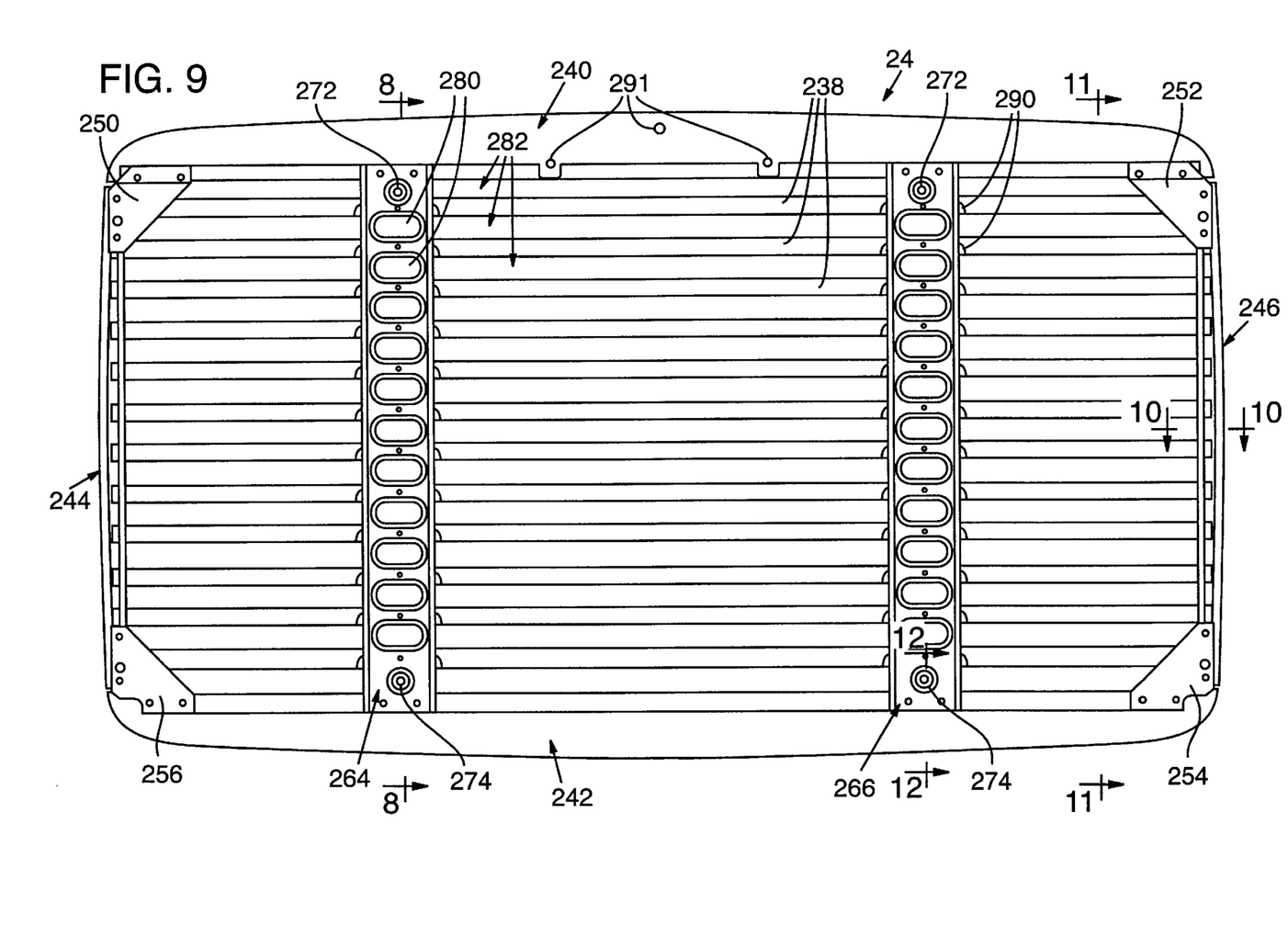
FIG. 9 is a rear view of the grille of FIG. 8.

With reference to FIG. 9, the illustrated grille 24 includes parallel spaced apart upper and lower transversely extending elongated frame elements or cross pieces 240, 242. In addition, the grille 24 includes upright side frame elements 244, 246 which are also spaced apart and elongated. The frame elements 240–246 are interconnected at their respective corners by corner braces 250–256 to provide an interconnected frame. In the FIG. 9 configuration, the frame is generally rectangular. The frame also includes a pair of upright spaced apart grille bar supporting members or brackets 264, 266. The brackets 264, 266 each include respective upper and lower mounts 272, 274 through which bolts or other fasteners extend to mount the assembled radiator grille to the truck 10.

The brackets 264 most preferably include air resistance reducing openings, some of which are indicated at 280, which are located to line up with the spaces (some being indicated at 282) between the respective grille bars 238. Consequently, the wind resistance otherwise provided by the brackets is reduced.

The grille bars 238 may have a bent section in the region of brackets 264, 266, such as indicated at 290 for several of the grille bars, to give the grille a distinctive, recognizable trademark appearance indicating the source of origin of the vehicle from Freightliner Corporation, the assignee of the present invention. The remaining major sections of the grille bars are not bent. The upper frame element 240 includes plural openings indicated at 291 to which a name plate for the vehicle manufacturer may be mounted.

Figures 8, 10, 11, 12:
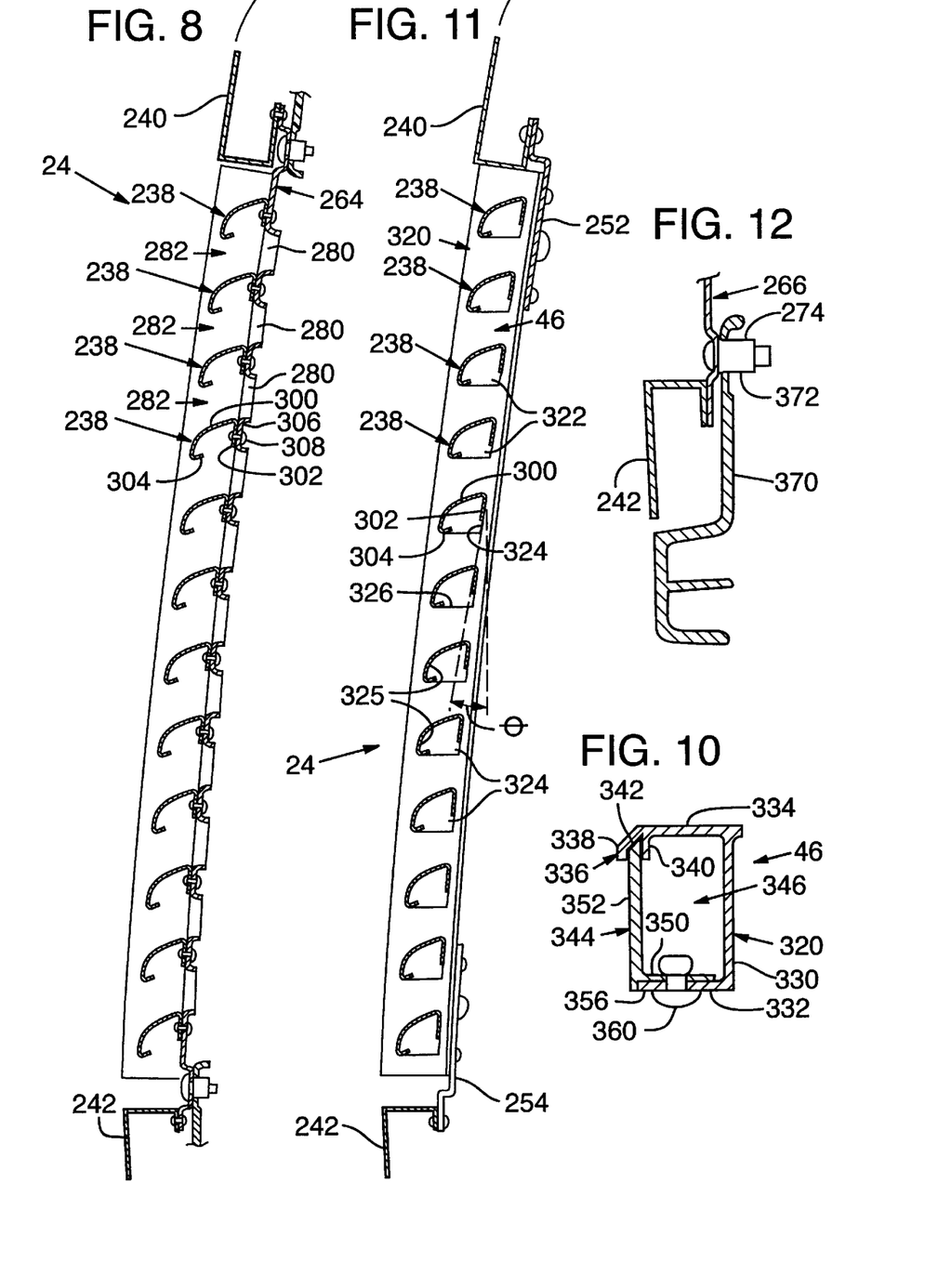
FIG. 8 is a vertical sectional view through one form of a grille used in an embodiment of the present invention.
FIG. 10 is a horizontal sectional view of a side frame member of the grille of FIG. 8.
FIG. 11 is a side elevational view of a grille side frame member used in the grille of FIG. 8.
FIG. 12 is a side view of a grille mount used to secure the grille of FIG. 8 to the vehicle.

With reference to FIG. 8, the interconnection of a plurality of grille bars 238 to the brackets 264, 266 (in this case with reference to bracket 264) is shown. Each of the grille bars 238 include a leading profile defining flange portion 300, a rear leg flange portion 302, and a return flange portion 304. A more detailed description of the grille bars 238 included in the grille is set forth below in connection with FIG. 13. The rear leg flange 302 is generally upright and is positioned to abut a support piece 306 of the bracket 264. A fastener, such as a rivet 308 or other fastener, is used to secure the rear leg flange 302 to the support bracket 306 to thereby rigidly and securely mount the grille bar 238 to the bracket 264. In the same manner, each of the other grille bars 238 may be mounted to the bracket 264 and also to the bracket 266.

FIG. 11 illustrates one form of a grille side frame element 246. Element 246 includes an upright inner grille bar support 320 having a plurality of openings or pockets 322. A few of such pockets 322 are numbered in FIG. 11. The pockets have boundaries which may be configured to match the outer configuration of the grille bars. Each pocket 322 receives the end of an associated grille bar. That is, the pockets 322 may include a generally upright rear bounding surface 325 and a curved front surface 324 which matches the contour of the outer air deflection surface of the leading profile defining flange portion. Frame element 244 may be the mirror image of element 246.

With reference to FIG. 10, the grille bar support 320 may be generally of a U-shaped construction having a face or base 330 and a pair of spaced apart parallel legs 332, 334 projecting outwardly from the base 330 in a common direction. The leg 334 has a distal or free end portion 336 which includes a pair of flanges 338, 340 projecting orthogonally from the leg 334 toward the leg 332. The legs 338, 340 define a flange end receiving slot 342 angled at its base as shown in FIG. 10.

The illustrated side frame element 246 includes a second or outer upright element 344 (FIG. 10) which interconnects with the side frame support to lock side frame components 320, 344 together. This locking is assisted by the overlapping nature of leg 350 and leg 332, and also by the interfit of the end of leg flange 352 into the slot 342. Plural fasteners, such as rivets 360 spaced along the length of the side components, hold components 320, 344 together.

Although numerous side frame constructions may be used, the illustrated construction is not only aesthetically pleasing, but also provides a rigid side rail element into which the grille bar receiving pockets may be formed. Also, the boxlike construction of side frame elements 320, 344 provides a compartment or chamber 346 within which the ends of the grille bars terminate. Therefore, sharp edges at the ends of the grille bars are shielded from contact by someone reaching their hands past the grille. The grille bar ends are also visually shielded.

With reference to FIG. 11, the grille bars 238 are typically oriented such that, when the radiator grille is mounted to a vehicle, the rear leg flange portions 302 are not vertical. That is, on average, the rear surface of leg flange portion 302, and thus the leg flange portion, is tilted forward from vertical by an angle θ. The angle θ preferably averages six degrees in the illustrated grille although other configurations may be used. For example, the rear leg flange 306 may be vertical or at some other attitude.

FIG. 12 illustrates the side support bracket 266 and the coupling 274 in one form which may be used to connect the grille to the vehicle components 370 surrounding the grille receiving opening 22 of the truck. Mount 274 preferably includes an isolator 372 of rubber or other resilient material positioned to separate the grille, and more particularly the metal components of the grille, such as bracket 266 and lower frame piece 242, from the vehicle surfaces to which the grille is mounted. A bolt or other fastener mounts the grille in place, as shown in FIG. 12. The mounts 272, 274 may be similarly constructed.

Figure 13:
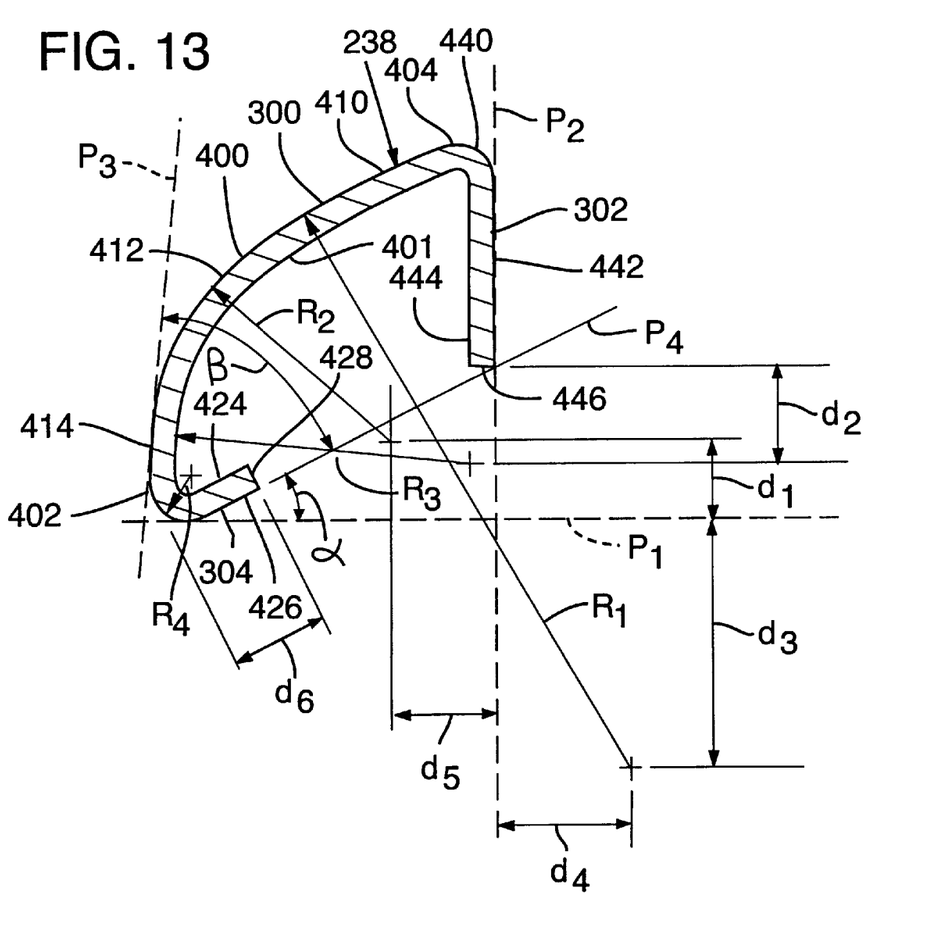
FIG. 13 is a cross-sectional view of a grille bar used in the grille of FIG. 8.

A preferred cross sectional configuration for the grille bar 238 is illustrated in FIG. 13. In FIG. 13, the leading profile defining flange portion 300 includes a forward or frontal air deflecting surface 400 as well as an opposed interior surface 401. The leading profile defining flange portion 300 includes upper and lower end portions 404, 402. In addition, the frontal air deflecting surface 400 is preferably of an air foil shape. The lower end portion 402 of flange portion 300 extends downwardly to a transition region at which a return bend is formed to provide the return flange 304. The radius of the return bend is indicated as R4. The upper end portion 404 extends upwardly to a transition region at which a downward bend is formed to provide the leg flange 302.

The return flange 304 has an upper surface 424 and a lower surface 426 and terminates in an end surface 428. The lower surface 426 is generally in a plane indicated as P4 in this figure. The lower section 414 of the flange portion 300 is intersected by a plane P3 which also intersects the plane P4 at an angle β. The angle β between plane P3 and P4 is preferably an acute angle and most preferably about fifty degrees. In addition, the angle between plane P4 and a horizontal plane P1, indicated as angle α in FIG. 13, is preferably also acute with twenty-seven degrees being a specifically preferred example. The leg flange portion 302 projects downwardly from the upper end portion 404 of the leading profile defining flange portion 300. That is, a bend is formed at location 440 where the flange changes from the leading flange portion to the rear leg portion. The rear leg portion includes a rear major surface 442 and an interior or front major surface 444 and terminates in an end or lower edge surface 446. In FIG. 13, the rear leg surface 442 is oriented in plane P2 which is vertical and perpendicular to the plane P1.

As can be seen in FIG. 13, the return flange portion 304 extends in a direction toward the lower end of the leg flange 302. In a most preferred embodiment, the plane containing the lower surface 426 of return flange 304 also intersects the bottom edge 446 of the rear leg 302. It should be noted that, with the orientation shown in FIG. 13, the lower surface of the return flange 304 forms the base of an air foil configuration with the upper surface of the air foil being defined by the frontal air deflecting surface 400 of flange portion 300. Frontal air deflecting surface 400 is generally of a convex configuration. In the preferred form, the air deflecting surface 400 has an upper section 410 of a first radius $R_1$, a central section 412 of a second radius $R_2$ and a lower section 414 of a third radius $R_3$. In the illustrated embodiment, $R_1$ is greater than $R_3$, and $R_2$ is the smallest of these three radii. Also, the rear surface 442 of leg flange appears to be flat in FIG. 13, but it actually may have a small radius of curvature (e.g. 5928.5 meters). The preferred manner of constructing the grille bars 238 is to roll form them from flat metal bars. An exemplary preferred material is aluminum.

Although variable, the leg flange preferably does not project any more than about one-half of the distance between the upper portion 404 of flange 300 and the lower portion 402 of the flange 300. Also, it is preferred that the horizontal distance of projection (along plane $P_1$) of the return flange 304 be less than one-half, and most preferably no less than about one-third of the horizontal distance between the front edge 402 of the grille bar and the rear edge 442.

Dimensions may be varied, but suitable dimensions are set forth in the table below. These dimensions may be varied.

| | |
|---|---|
| d1 | 3.7 mm |
| d2 | 5.1 mm |
| d3 | 22.5 mm |
| d4 | 13.0 mm |
| d5 | 5.3 mm |
| d6 | 5.0 mm |
| R1 | 44.0 mm |
| R2 | 12.0 mm |
| R3 | 17.5 mm |
| R4 | 2.0 mm |

A grille bar as illustrated and described above is extremely aerodynamically efficient. In addition, the grille bars may be easily manufactured, such as by roll forming the grille bars from respective pieces of flat aluminum stock.

Figure 14:
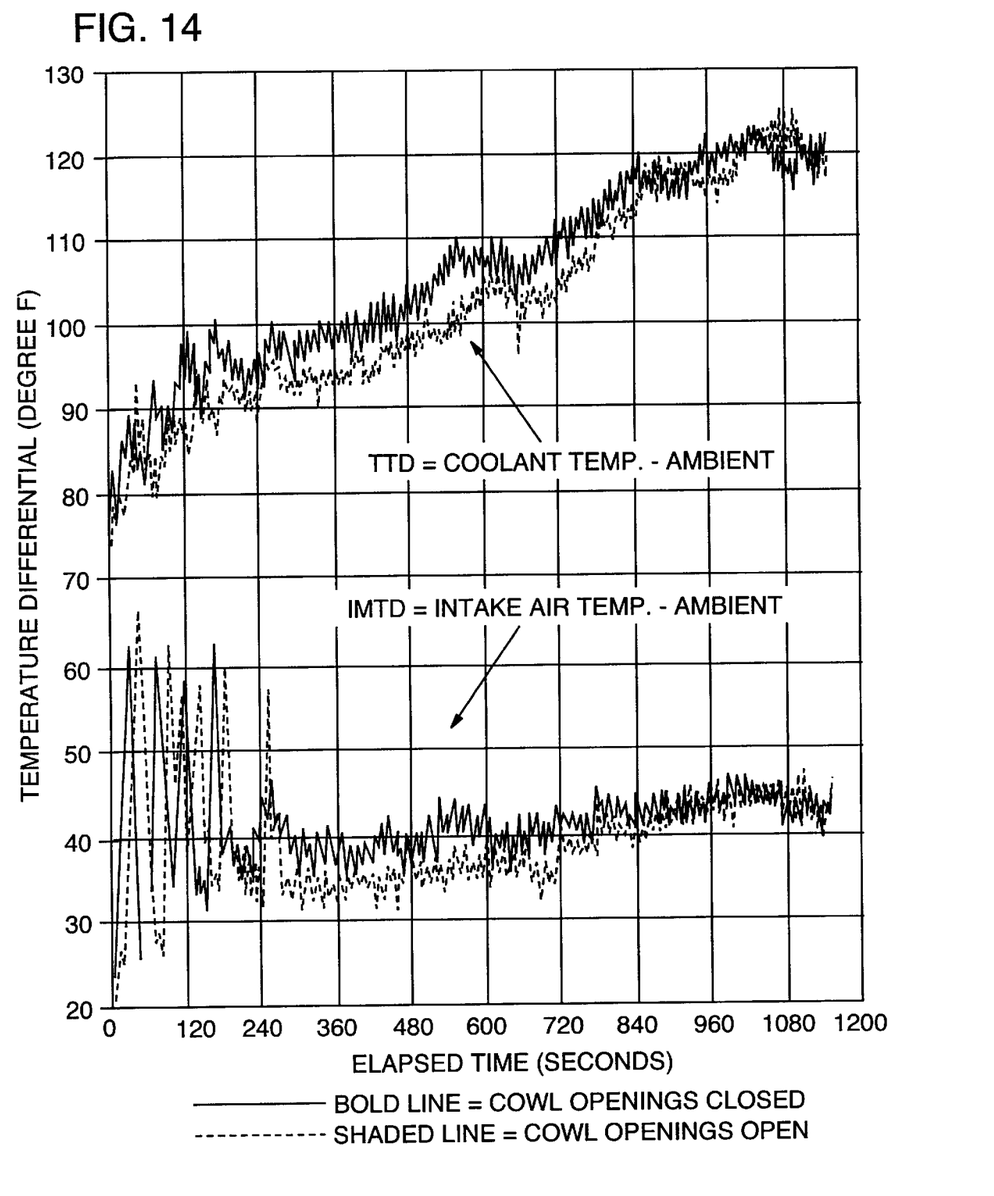
FIG. 14 is a graph illustrating test results of the underhood air flow management system of the FIGS. 3 and 4 embodiment of the present invention on a truck traveling up a steep grade in high temperature desert conditions.

FIG. 14 illustrates test results from an underhood air management cooling system in accordance with the present invention.

The tests represented by the graph of FIG. 14 was conducted utilizing a Freightliner Century Class prototype V3 truck having a 500 HP Model 3406 engine from Caterpillar Corporation. Each cowl opening was approximately seventy-five square inches. This test was conducted using a truck traveling up the Baker grade between Las Vegas and Los Angeles under desert conditions. The ambient air temperature was believed to be about 110° F. at the bottom of the grade and about 95° F. at the top of the grade.

The upper two plots of FIG. 14 represent the temperature differential between the engine cooling fluid temperature and ambient air temperature with the cowl openings 40 opened compared to the temperature differential with the cowl openings 40 blocked shut. The lower plots in these figures represent a comparison of the engine intake air temperature differential (downstream from the charge air cooler 62 in FIG. 2). That is, the difference between the intake engine air temperature and ambient temperature both with the cowl openings open and with such cowl openings blocked shut.

The fluctuations between elapsed times zero and 240 seconds are due in large part to the effects of the cooling fan as it cycles on and off as climbing of the grade commenced. At about an elapsed time of 240 seconds, the cooling fan remained on as the engine was hot enough for continuous fan operation. In both of these examples, with the cowl openings 40 of the present invention open, engine cooling fluid and the engine air intake temperature on average was cooler than in the case with the cowl openings blocked shut. During significant portions of the test, these differences averaged between five and seven degrees F. It is believed that better thermodynamic efficiency in this regard will lead to better overall fuel economy and engine efficiency.

Having illustrated and described the principles of our invention with reference to a preferred embodiment, it should be apparent to those of ordinary skill in the art that the invention may be modified in arrangement and detail without departing from such principles. We claim as our invention all such modifications as fall within the scope and spirit of the following claims.

What is claimed is:

1. A truck comprising:
    a frame having a longitudinal axis;
    a hood having first and second depending hood sections coupled to the frame and which together define an engine compartment, and wherein each depending hood section includes a rear edge;
    an engine positioned within the engine compartment;
    a windshield extending upwardly from a location rearwardly of the hood;
    a grille receiving opening at the front of the hood;
    a grille in the grille receiving opening;
    a radiator rearwardly of the grille receiving opening, whereby at least some of the air passing through the grille flows through the radiator; and
    first and second side cowl portions, the side cowl portions each being adjacent a rear edge of the respective first and second depending hood sections, the side cowl portions including respective cowl extension portions extending inwardly adjacent to the rear edges of the respective depending hood sections, the cowl extension portions each having a forward air deflection surface extending forwardly toward the front of the vehicle and inwardly toward the center of the vehicle, elongated cowl openings being defined at each side of the truck by the rear edges of the depending hood sections and the cowl extension portions, whereby a significant portion of the air entering the radiator flows past the engine and exits through the cowl openings, the air deflection surfaces assisting in directing the air outwardly through the cowl openings; and
    a hood latch positioned at least partially within one of the cowl openings, the hood latch being partially concealed by a respective one of the first and second depending hood sections.

2. A truck according to claim 1 in which the cowl openings are generally rectangular and extend at least about the full height of the depending hood sections rear edges.

3. A truck according to claim 1 in which the cowl openings are door free and baffle free.

4. A truck according to claim 1 in which the depending hood sections have side walls which are opening free.

5. A truck according to claim 1 in which the truck includes front wheel wells, the truck also including a wheel well air deflector having portions positioned to substantially enclose the front and top of the wheel wells and to at least partially enclose the interior sides of the wheel wells, each wheel well having a rearmost portion, and wherein the cowl openings are located forwardly of the rearmost portion of the wheel wells.

6. A truck according to claim 5 in which the wheel well air deflectors have a portion positioned to substantially enclose the rear of the wheel wells.

7. A truck according to claim 1 in which the cowl openings are over thirty square inches.

8. A truck according to claim 1 in which the air deflection surface of each cowl extension portion is curved.

9. A truck according to claim 1 in which the air deflection surface of each cowl extension portion has a convex curved shape.

10. A truck according to claim 1 in which the cowl opening is positioned and shaped such that a major air flow passageway is provided from the engine compartment and through the cowl opening without severe bends.

11. A truck according to claim 1 in which the rear edges of the respective adjacent depending hood sections are vertical and wherein the cowl air deflection surfaces each have a forward portion which is positioned forwardly of the rear edge of the adjacent depending hood sections such that the cowl air deflection surfaces and depending hood sections block lines of sight perpendicular to the longitudinal axis and into the engine compartment.

12. A truck according to claim 1, wherein each rear edge includes at least one substantially straight section.

13. A truck according to claim 12, wherein the straight section is substantially vertical.

14. A truck comprising:
    a frame having a longitudinal axis;
    a hood and first and second side depending hood sections coupled to the frame and which together define an engine compartment, each depending hood section including a rear edge;
    an engine positioned within the engine compartment;
    a windshield extending upwardly from a location rearwardly of the hood;
    a grille receiving opening at the front of the hood;
    a grille in the grille receiving opening;
    a radiator rearwardly of the grille receiving opening, whereby air passing through the grille flows through the radiator;
    a cowl with first and second side cowl portions adjacent the respective rear edges of the first and second depending hood sections, the side cowl portions including respective cowl extension portions extending inwardly at a location adjacent to and spaced from the rear edges of the depending hood sections, the cowl extension portions each having a curved air deflection surface projecting forwardly toward the front of the vehicle, elongated cowl openings being defined at each side of the truck by the rear edges of the depending hood sections and the cowl extension portions, whereby at least some of the air entering the radiator flows past the engine and exits through the cowl openings, the air deflection surfaces assisting in directing the air outwardly through the cowl openings;

the cowl openings being door free, generally rectangular, and extending at least about the full height of the depending hood sections rear edges;

the depending hood sections having side walls which are opening free;

air shields positioned to impede the flow of air past the radiator and into the engine compartment other than through the radiator;

the depending hood sections defining respective front wheel wells, the truck having a bumper positioned below the grille and extending from side to side of the vehicle, the bumper having a lower bumper flap extension therefrom, the truck having wheel well roofs positioned respectively in the respective wheel wells, each wheel well roof having front and rear edges and a downwardly extending side wall which at least partially separates the wheel well from the engine compartment, a front wheel well section extending from the wheel well roof front edge to the lower bumper flap and a mud flap section extending downwardly from the wheel well roof rear edge, whereby the wheel well is substantially sealed at the front end and partially sealed along the side to direct air passing through the radiator away from the wheel well at such locations, the front wheel wells each having a rearmost portion;

a charge air cooler included between the grille and the radiator with air deflectors positioned to direct air passing through the charge air cooler through the radiator;

the cowl openings being positioned at an elevation entirely above the top of the front wheels and forwardly of the rearmost portion of each of the front wheel wells;

a cooling fan is positioned between the engine and the radiator; and wherein the cowl air deflection surfaces each have a forward portion positioned forwardly of the rear edge of the adjacent depending hood section such that the cowl air deflection surfaces and depending hood sections block lines of sight perpendicular to the longitudinal axis and into the engine compartment.

* * * * *

UNITED STATES PATENT AND TRADEMARK OFFICE
CERTIFICATE OF CORRECTION

PATENT NO.    : 6,230,832 B1
DATED         : May 15, 2001
INVENTOR(S)   : von Mayenburg et al.

It is certified that error appears in the above-identified patent and that said Letters Patent is hereby corrected as shown below:

Column 5,
Line 50, "cooler 62" should read -- cooler 62 or the sides and top of the radiator 60 shown in Figs. 2 and 3. --.

Column 11,
Line 51, "deflection" should read -- deflector --.

Signed and Sealed this

Twenty-sixth Day of November, 2002

*Attest:*

JAMES E. ROGAN
*Attesting Officer*   *Director of the United States Patent and Trademark Office*